US009392143B1

(12) United States Patent
Kohn et al.

(10) Patent No.: US 9,392,143 B1
(45) Date of Patent: Jul. 12, 2016

(54) HIGH PERFORMANCE MEMORY SYSTEM FOR 3D COLOR CORRECTION

(75) Inventors: Leslie D. Kohn, Saratoga, CA (US); Manish Kumar Singh, Tracy, CA (US)

(73) Assignee: Ambarella, Inc., Santa Clara, CA (US)

( * ) Notice: Subject to any disclaimer, the term of this patent is extended or adjusted under 35 U.S.C. 154(b) by 1532 days.

(21) Appl. No.: 12/751,130

(22) Filed: Mar. 31, 2010

(51) Int. Cl.
*H04N 1/60* (2006.01)
(52) U.S. Cl.
CPC .................................. *H04N 1/6019* (2013.01)
(58) Field of Classification Search
None
See application file for complete search history.

(56) References Cited

U.S. PATENT DOCUMENTS

| 4,837,722 | A | * | 6/1989 | Sara ...................... G06F 17/175 |
| | | | | 708/290 |
| 5,684,981 | A | * | 11/1997 | Jones .............................. 345/566 |
| 5,717,507 | A | * | 2/1998 | Vondran, Jr. ................... 358/525 |
| 6,640,296 | B2 | * | 10/2003 | Takala ........................... 711/220 |
| 6,753,988 | B1 | * | 6/2004 | Eldredge ........................ 358/535 |
| 2006/0114528 | A1 | * | 6/2006 | Ito ................... 358/525 |
| 2007/0279703 | A1 | * | 12/2007 | Fukuda ........................ 358/448 |
| 2009/0125685 | A1 | * | 5/2009 | Bayer et al. .................... 711/149 |

* cited by examiner

*Primary Examiner* — Ryan D McCulley
(74) *Attorney, Agent, or Firm* — Christopher P. Maiorana, PC

(57) ABSTRACT

An apparatus including a memory, a first circuit and a second circuit. The memory may be divided into eight banks. Each bank may store a portion of a three-dimensional (3D) color correction lookup table. The first circuit may be configured to address the memory in response to an index of an input point. The second circuit may be configured to arrange outputs of the eight banks for color interpolation.

20 Claims, 8 Drawing Sheets

US 9,392,143 B1

HIGH PERFORMANCE MEMORY SYSTEM FOR 3D COLOR CORRECTION

FIELD OF THE INVENTION

The present invention relates to a method and/or architecture for digital photography generally and, more particularly, to a high performance memory system for three dimensional (3D) color correction.

BACKGROUND OF THE INVENTION

Camera image processing pipelines use a color correction system to translate a linear sensor RGB space to an RGB image output space (i.e., BT629 and BT709 for video, or sRGB for still pictures). Conventional RGB to RGB linear space conversion is performed with a 3×3 matrix multiplication, followed by a tone curve operation.

It would be desirable to have a more flexible color correction system that provides subjectively improved color reproduction.

SUMMARY OF THE INVENTION

The present invention concerns an apparatus including a memory, a first circuit and a second circuit. The memory may be divided into eight banks. Each bank may store a portion of a three-dimensional (3D) color correction lookup table. The first circuit may be configured to address the memory in response to an index of an input point. The second circuit may be configured to arrange outputs of the eight banks for color interpolation.

The objects, features and advantages of the present invention include providing a high performance memory system for three dimensional (3D) color correction that may (i) provide access to the 8 nearest table points in one clock cycle without increasing the memory size significantly, (ii) use a memory subdivided into 8 banks with parallel access, (iii) store the eight closest table entries to any input space point in different banks to allow parallel access, (iv) assign a table entry to a bank based on the least significant bit of the entries index in each dimension of the input space, (v) concatenate the least significant bit (LSB) from each of the three dimensions (e.g., R, G, B) in the input space to form a 3-bit number for selecting one of 8 banks, and/or (v) insure no bank conflicts for the 8 closest points in a 3D color correction look-up table.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
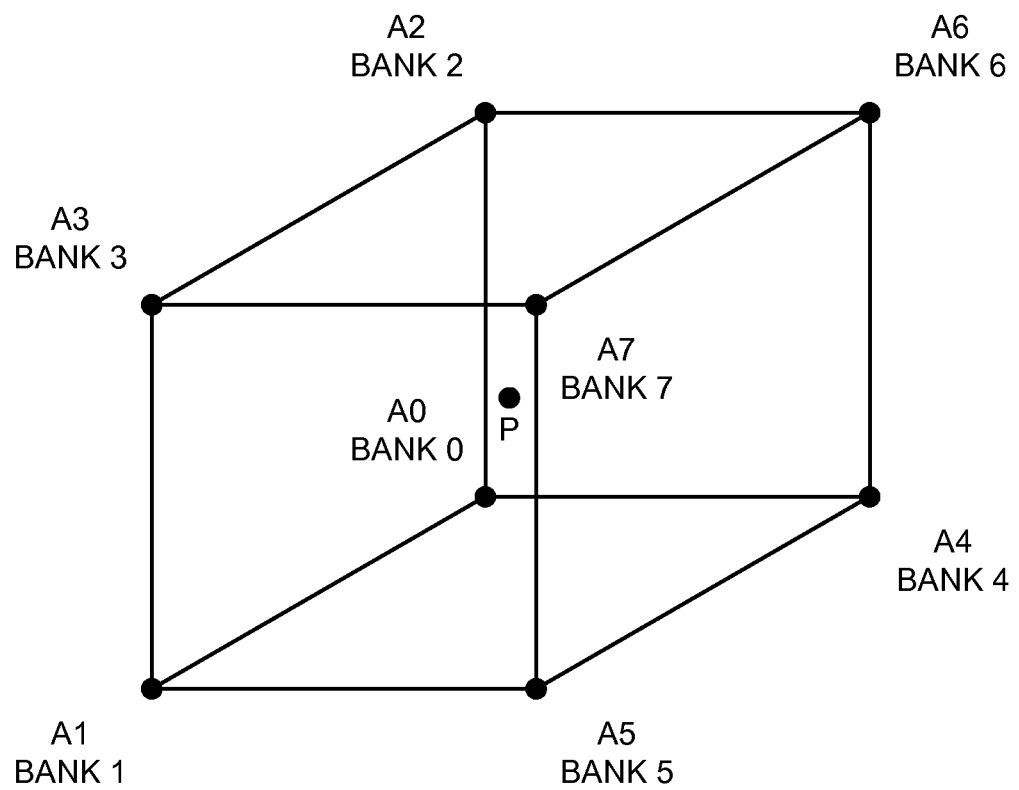
FIG. 1 is a diagram illustrating an example of eight nearest table entries to an input point stored in separate memory banks for use in an interpolation process in accordance with the present invention.

Referring to FIG. 1, a block diagram is shown illustrating an example of eight nearest table entries to an input point P. The eight nearest table entries are generally stored in separate memory banks (e.g., BANK 0-BANK 7). The eight nearest table entries may be used in an interpolation process in accordance with the present invention. The present invention generally provides a more flexible color correction system that provides subjectively improved color reproduction. For example, a particular color (e.g., skin shade) may be shifted based upon subjective criteria without affecting unrelated colors. In one example, a color correction system in accordance with the present invention may allow flexible mapping using a three dimensional (3D) table lookup function. The 3D table lookup function generally allows arbitrary mapping of the input color space to an output color space (e.g., BT629 and BT709 for video, sRGB for still pictures, etc.).

In general, interpolation may also be used since the input point may not exactly match an input grid defined by the table entry spacing. To avoid visual artifacts such as contouring, a smoothly varying interpolation should be used as the input point moves from one table input grid point to neighboring table input grid points. In order to implement the smoothly varying interpolation, a number (e.g., from 4 to 8) of the nearest table entries may be accessed. In one example, the addresses (e.g., a0-a7) of the eight closest points A0-A7 may be expressed as follows:

$$a0=\{x[n:1],y[n:1],z[n:1]\};$$

$$a1=\{x[n:1],y[n:1],z[n:1]+1\};$$

$$a2=\{x[n:1],y[n:1]+1,z[n:1]\};$$

$$a3=\{x[n:1],y[n:1]+1,z[n:1]+1\};$$

$$a4=\{x[n:1]+1,y[n:1],z[n:1]\};$$

$$a5=\{x[n:1]+1,y[n:1],z[n:1]+1\};$$

$$a6=\{x[n:1]+1,y[n:1]+1,z[n:1]\};$$

$$a7=\{x[n:1]+1,y[n:1]+1,z[n:1]+\}).$$

The addresses of the eight closest points are generally not contiguous in a linear (1D) address space. A performance bottleneck may be created when a single ported memory is used and a color correction needs to be performed every clock cycle. A 4-8 port memory may be used to store the table, however implementation with a 4-8 port memory generally increases the table size by 4-8 times.

Figure 2:
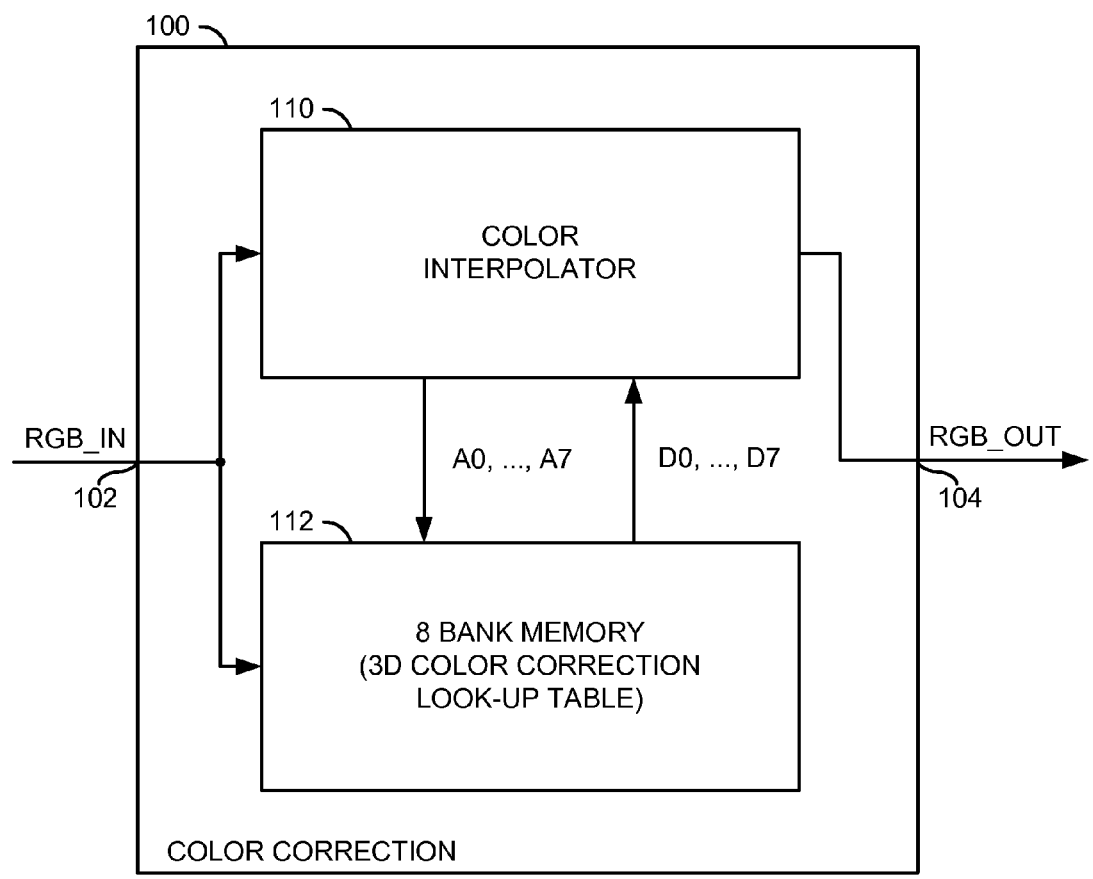
FIG. 2 is a block diagram illustrating an example color correction system in accordance with an example embodiment of the present invention.

Referring to FIG. 2, a diagram is shown illustrating an example color correction system 100 in accordance with an example embodiment of the present invention. The system 100 may be implemented, in one example, as part of a camera image processing pipeline. The system 100 may be configured, in one example, to generate points in an RGB image output space (e.g. BT629 and BT709 for video, sRGB for still pictures, etc.) in response to points of a linear sensor RGB input space. However, other 3D color spaces (e.g., YCbCr, YUV, HSV, etc.) may be implemented accordingly. The system 100 may have an input 102 that may receive an input signal (e.g., RGB_IN) and an output 104 that may present a signal (e.g., RGB_OUT). The signal RGB_IN may comprise points of the linear sensor RGB input space. The signal RGB_OUT may comprise points in the RGB image output space.

In one example, the system 100 may comprise a block 110 and a block 112. The block 110 may be implemented, in one example, as a color interpolator. In one example, the block 110 may be configured to perform tri-linear interpolation using conventional techniques. In another example, the block 110 may be configured to perform Sakamoto interpolation using conventional techniques. The block 112 may be implemented, in one example, as a memory. In one example, the memory 112 may be configured to store a three-dimensional (3D) color correction lookup table. The memory 112 is generally subdivided into 8 banks with parallel access. In general, the eight closest table entries to any point of the input space are always stored in different banks to allow parallel access. Since eight consecutive entries go to different banks, all eight banks may be read in a single cycle, even with single ported memory. The eight entries, after rearrangement by an output shuffle network, generally provide eight points of the lookup table that may be used for tri-linear interpolation (e.g., corresponding to the eight points A0 to A7 in FIG. 1).

In general, each table entry may be assigned to a bank based upon the least significant bit of an index of the table entry in each dimension of the input space (e.g., x[n:1], y[n:1], z[n:1]). Since there are three dimensions in the input space, the three least significant bits (LSBs) may be concatenated to from a 3-bit number that may be used to select one of the eight banks. The use of the three LSBs is generally sufficient to guarantee no bank conflicts for the eight closest points, because neighboring points must differ by one in the least significant bit in at least one dimension (e.g., as described above in connection with FIG. 1).

Figure 3:
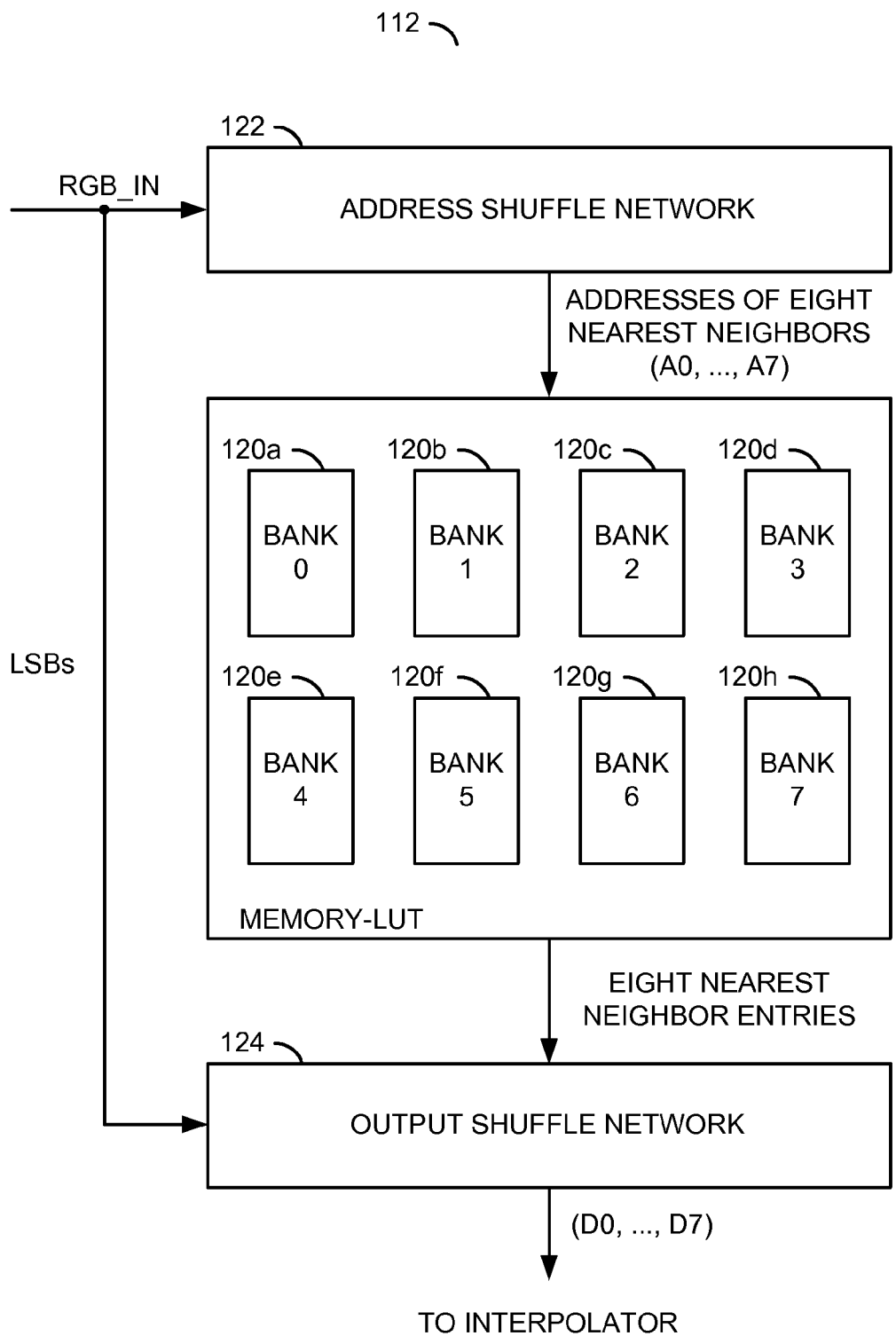
FIG. 3 is a block diagram illustrating an example memory system in accordance with an example embodiment of the present invention.

Referring to FIG. 3, a block diagram is shown illustrating an example memory system 112 in accordance with an example embodiment of the present invention. In one example, the memory 112 may comprise eight banks 120a-120h, an input block 122, and an output block 124. The input block 122 may be implemented, in one example, as an address shuffle network. The output block 124 may be implemented, in one example, as an output shuffle network. The order that points are stored in the banks 120a-120h of the memory 112 is generally different than the order in which the points are used in performing the color interpolation process. The difference in order is generally addressed by the shuffle network 122 on the addresses going to each bank and the shuffle network 124 on the outputs coming from each bank. In one example, each of the shuffle networks 122 and 124 may be implemented as a 3 stage perfect shuffle network, where each stage of the shuffle networks 122 and 124 may be controlled, in one example, based on the least significant bit of the index of one dimension (e.g., LSB_X, LSB_Y, LSB_Z) to provide points in the order described above in connection with FIG. 1.

Figure 4A:
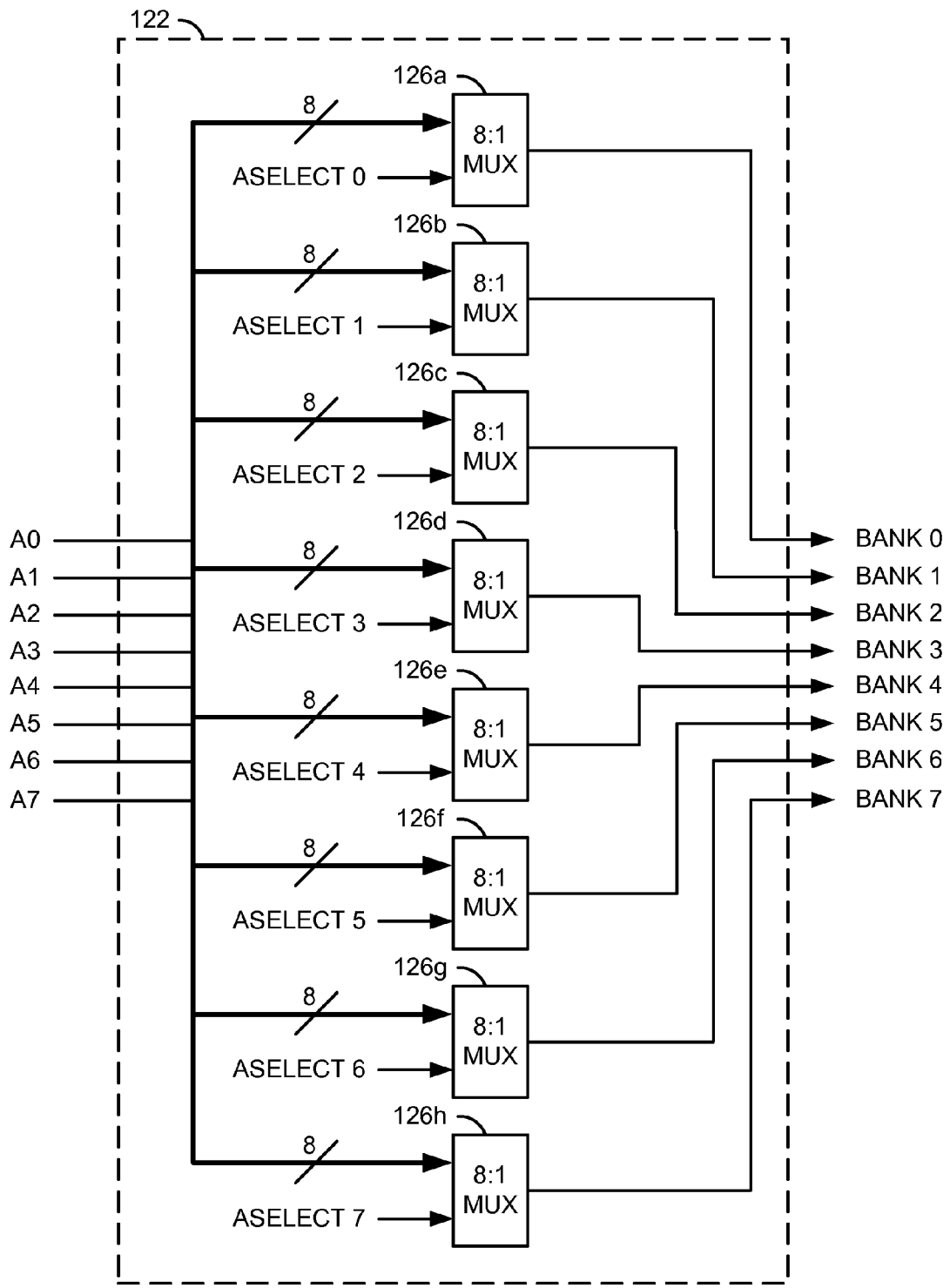
FIG. 4(A-D) are block diagrams illustrating example address and data shuffle networks in accordance with an example embodiment of the present invention.
Figure 4B:
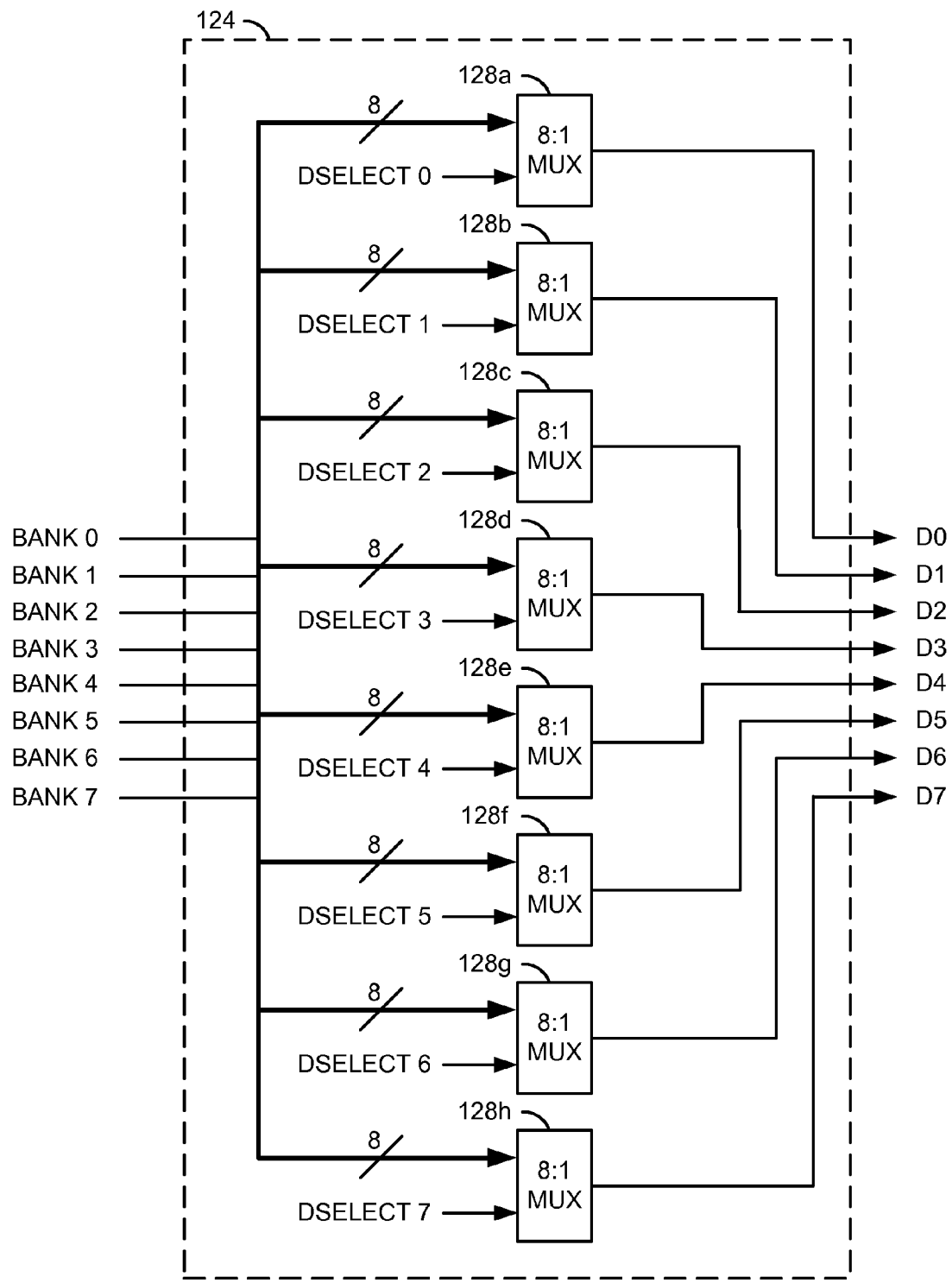

Referring to FIGS. 4A and 4B, block diagrams are shown illustrating an example address shuffle network 122 (FIG. 4A) and an example output shuffle network 124 (FIG. 4B) in accordance with an example embodiment of the present invention. The address shuffle network 122 may comprise, in one example, 8 address shuffle units 126a-126h. Each of the address shuffle units 126a-126h may be implemented, in one example, as a 8×1 switch (or multiplexer). Each of the address shuffle units 126a-126h may be associated with one of the eight memory banks 120a-120h. Each of the address shuffle units 126a-126h may have eight data inputs and a control input.

Each of the eight data inputs of the address shuffle units 126a-126h may receive one of the addresses a0-a7 of the eight closest points A0-A7. The control inputs of each of the address shuffle units 126a-126h may receive a respective control signal (e.g., ASELECT 0-ASELECT 7). The signals ASELECT 0-ASELECT 7 may be generated based on the LSBs of the addresses and the respective bank number. In one example, the signals ASELECT 0-ASELECT 7 may be generated based upon a bit wise AND of the LSBs and a logical complement of the bank number (e.g., n) associated with each address shuffle units 126a-126h (e.g., ASELECT n={LSB_x, LSB_y, LSB_z} & !(n)). For banks 0-7, the individual select signals of the address shuffle units 126a-126h may be generated, for example, as follows:

ASELECT 0={LSB_x, LSB_y, LSB_z} & 3'b111;
ASELECT 1={LSB_x, LSB_y, LSB_z} & 3'b110;
ASELECT 2={LSB_x, LSB_y, LSB_z} & 3'b101;
ASELECT 3={LSB_x, LSB_y, LSB_z} & 3'b100;
ASELECT 4={LSB_x, LSB_y, LSB_z} & 3'b011;
ASELECT 5={LSB_x, LSB_y, LSB_z} & 3'b010;
ASELECT 6={LSB_x, LSB_y, LSB_z} & 3'b001;
ASELECT 7={LSB_x, LSB_y, LSB_z} & 3'b000.

Similarly, the output data shuffle network 124 may comprise 8 data shuffle units 128a-128h. Each of the data shuffle units 128a-128h may be implemented, in one example, as an 8×1 switch (or multiplexer). Each of the data shuffle units 128a-128h may be associated with one of the eight memory banks 120a-120h. Each of the data shuffle units 128a-128h may have eight data inputs and a control input.

Each of the eight data inputs of the data shuffle units 128a-128h may receive one of the outputs of the eight memory banks. The control inputs of each of the data shuffle units 128a-128h may receive a respective control signal (e.g., DSELECT 0-DSELECT 7). The signals DSELECT 0-DSELECT 7 may be generated based on the LSBs of the addresses a0-a7 and a respective data index (e.g., i) associated with each data shuffle unit 128a-128h. In one example, the signals DSELECT 0-DSELECT 7 may be generated based upon a bit wise exclusive OR of the LSBs and the respective data index (e.g., DSELECT i={LSB_x, LSB_y, LSB_z}^i). For data entries 0-7 to the interpolator 110, the individual select signals of the output data shuffle units 128a-128h may be generated, for example, as follows:

DSELECT 0={LSB_x, LSB_y, LSB_z}^3'b000;
DSELECT 1={LSB_x, LSB_y, LSB_z}^3'b001;
DSELECT 2={LSB_x, LSB_y, LSB_z}^3'b010;
DSELECT 3={LSB_x, LSB_y, LSB_z}^3'b011;
DSELECT 4={LSB_x, LSB_y, LSB_z}^3'b100;
DSELECT 5={LSB_x, LSB_y, LSB_z}^3'b101;
DSELECT 6={LSB_x, LSB_y, LSB_z}^3'b110;
DSELECT 7={LSB_x, LSB_y, LSB_z}^3'b11.

Figure 4C:
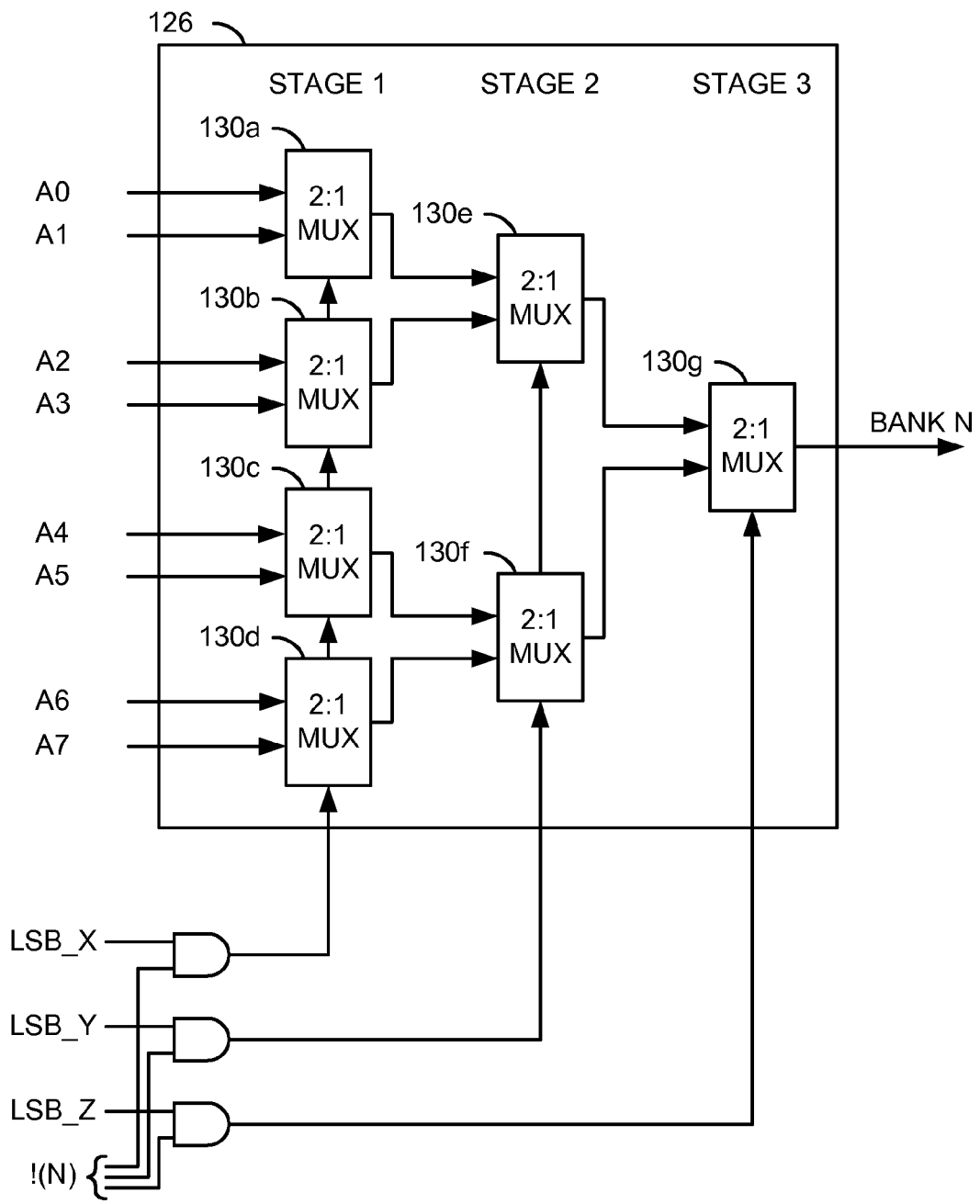
Figure 4D:
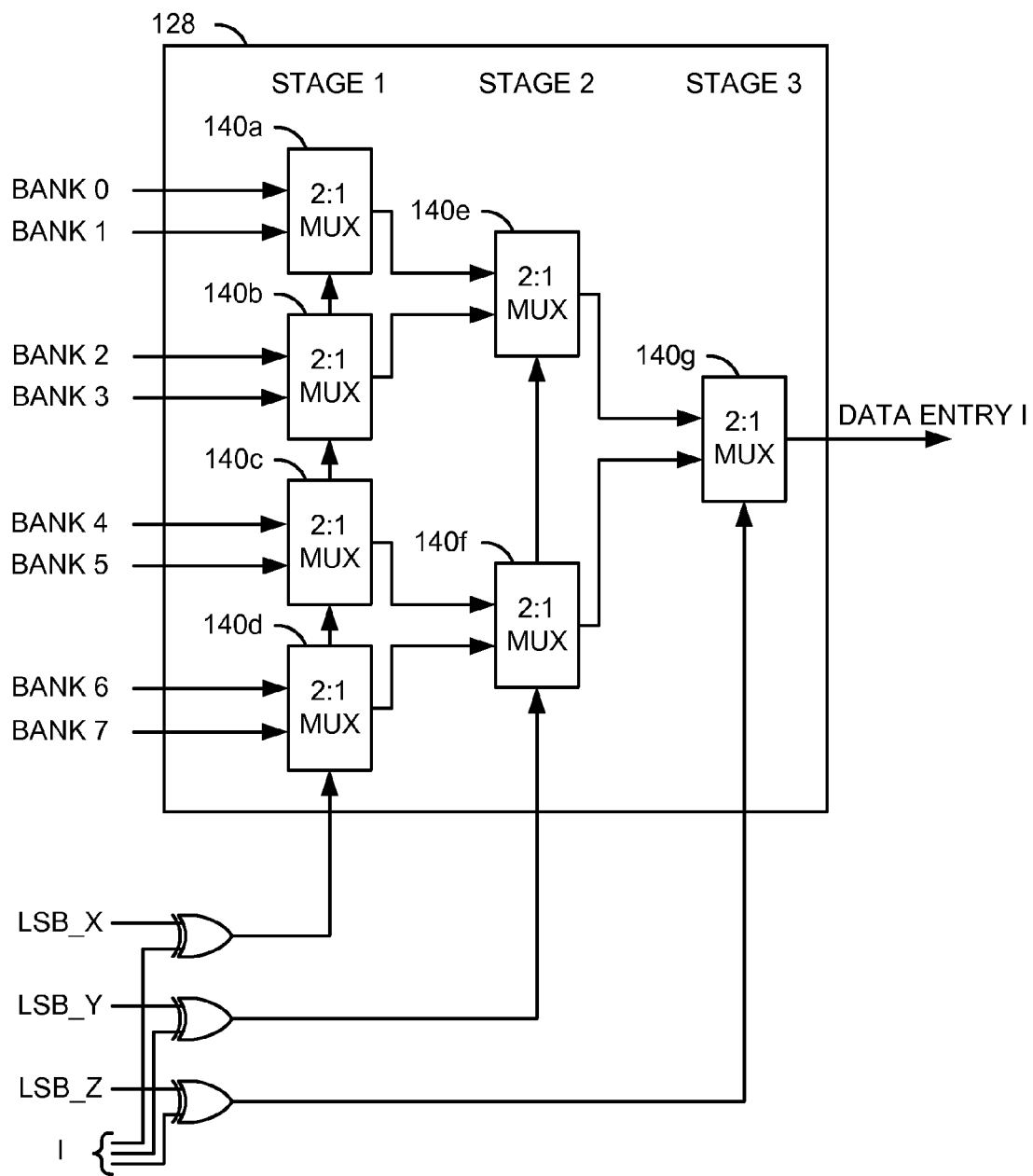

Referring to FIGS. 4C and 4D, block diagrams are shown illustrating an example address shuffle unit 126 (FIG. 4C) and an example data shuffle unit 128 (FIG. 4D) in accordance with an example embodiment of the present invention. The address shuffle unit 126 may be implemented, in one example, using seven 2×1 switches (or multiplexers) 130a-130g. In one example, the switches 130a-130g may be arranged as a 3 stage perfect shuffle network, where each stage of the address shuffle unit 126 may be controlled, in one example, based on the least significant bit of the index of one dimension (e.g., LSB_X, LSB_Y, LSB_Z) and a bit from a logical complement of a 3-bit bank number of the memory bank associated with the particular address shuffle unit (e.g., 3'b111 for bank 0, 3'b110 for bank 1, etc.).

The data shuffle unit 128 may be implemented, in one example, using seven 2×1 switches (or multiplexers) 140a-140g. In one example, the switches 140a-140g may be arranged as a 3 stage perfect shuffle network, where each stage of the data shuffle unit 128 may be controlled, in one example, based on the least significant bit of the index of one dimension (e.g., LSB_X, LSB_Y, LSB_Z) and a bit from a 3-bit data entry index (e.g., 3'b000 for data entry 0, 3'b001 for data entry 1, etc.).

In one example, an interpolation that uses less than eight entries (e.g., Sakamoto Interpolation) may be implemented to optimize reading from the memory banks to save memory power. For example, in Sakamoto Interpolation four entries may be fetched rather than all eight entries. In Sakamoto Interpolation the particular entries fetched may be divided into six cases:

case 0: Entries used for interpolation=0, 4, 6, 7;
    case 1: Entries used for interpolation=0, 4, 5, 7;
    case 2: Entries used for interpolation=0, 2, 6, 7;
    case 3: Entries used for interpolation=0, 2, 3, 7;
    case 4: Entries used for interpolation=0, 1, 5, 7;
    case 5: Entries used for interpolation=0, 1, 3, 7.

Since only 4 entries are used in any case, only the relevant 4 banks are accessed, instead of all 8 banks. The reduction in the number of banks accessed may save memory power. The banks that may be read for Sakamoto Interpolation, based on the 3-bit number formed by concatenation of the three least significant bits (LSBs) and the different cases may be illustrated by the following examples:

For {LSB_x, LSB_y, LXB_z}=0:
    case 0: read only banks 0, 4, 6, 7;
    case 1: read only banks 0, 4, 5, 7;
    case 2: read only banks 0, 2, 6, 7;
    case 3: read only banks 0, 2, 3, 7;
    case 4: read only banks 0, 1, 5, 7;
    case 5: read only banks 0, 1, 3, 7.
For {LSB_x, LSB_y, LXB_z}=1:
    case 0: read only banks 1, 5, 6, 7;
    case 1: read only banks 1, 4, 5, 6;
    case 2: read only banks 1, 3, 6, 7;
    case 3: read only banks 1, 2, 3, 6;
    case 4: read only banks 0, 1, 4, 6;
    case 5: read only banks 0, 1, 2, 6.
For {LSB_x, LSB_y, LXB_z}=2:
    case 0: read only banks 2, 4, 5, 6;
    case 1: read only banks 2, 5, 6, 7;
    case 2: read only banks 0, 2, 4, 5;
    case 3: read only banks 0, 1, 2, 5;
    case 4: read only banks 2, 3, 5, 7;
    case 5: read only banks 1, 2, 3, 5.
For {LSB_x, LSB_y, LXB_z}=3:
    case 0: read only banks 3, 4, 5, 7;
    case 1: read only banks 3, 4, 6, 7;
    case 2: read only banks 1, 3, 4, 5;
    case 3: read only banks 0, 1, 3, 4;
    case 4: read only banks 2, 3, 4, 6;
    case 5: read only banks 0, 2, 3, 4.
For {LSB_x, LSB_y, LXB_z}=4:
    case 0: read only banks 0, 2, 3, 4;
    case 1: read only banks 0, 1, 3, 4;
    case 2: read only banks 2, 3, 4, 6;
    case 3: read only banks 3, 4, 6, 7;
    case 4: read only banks 1, 3, 4, 5;
    case 5: read only banks 3, 4, 5, 7.
For {LSB_x, LSB_y, LXB_z}=5:
    case 0: read only banks 1, 2, 3, 5;
    case 1: read only banks 0, 1, 2, 5;
    case 2: read only banks 2, 3, 5, 7;
    case 3: read only banks 2, 5, 6, 7;
    case 4: read only banks 0, 2, 4, 5;
    case 5: read only banks 2, 4, 5, 6.
For {LSB_x, LSB_y, LXB_z}=6:
    case 0: read only banks 0, 1, 2, 6;
    case 1: read only banks 1, 2, 3, 6;
    case 2: read only banks 0, 1, 4, 6;
    case 3: read only banks 1, 4, 5, 6;
    case 4: read only banks 1, 3, 6, 7;
    case 5: read only banks 1, 5, 6, 7.
For {LSB_x, LSB_y, LXB_z}=7:
    case 0: read only banks 0, 1, 3, 7;
    case 1: read only banks 0, 2, 3, 7;
    case 2: read only banks 0, 1, 5, 7;
    case 3: read only banks 0, 4, 5, 7;
    case 4: read only banks 0, 2, 6, 7;
    case 5: read only banks 0, 4, 6, 7.

Figure 5:
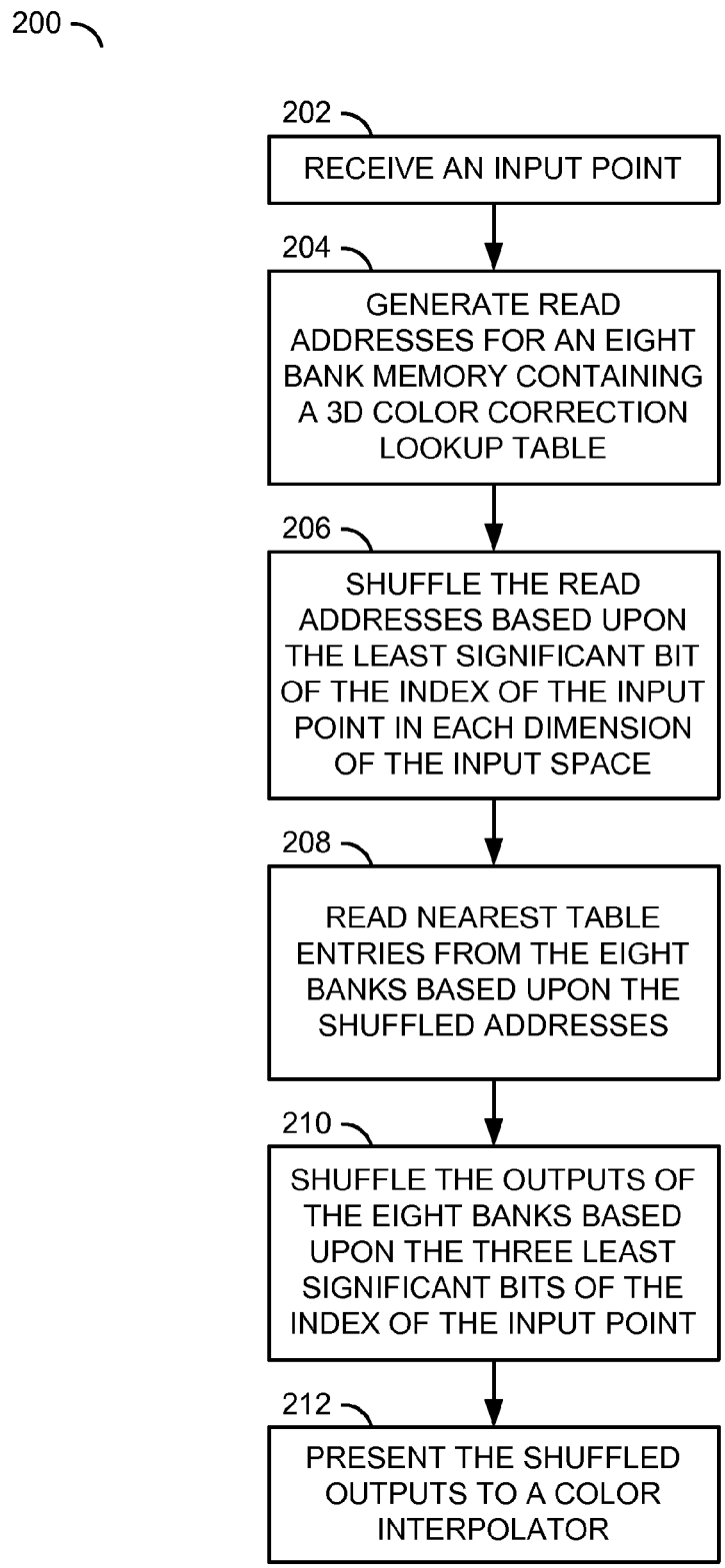
FIG. 5 is a flow diagram illustrating a process in accordance with an example embodiment of the present invention.

Referring to FIG. 5, a flow diagram is shown illustrating a process 200 in accordance with an example embodiment the present invention. The process (or method) 200 may comprise a step (or block) 202, a step (or block) 204, a step (or block) 206, a step (or block) 208, a step (or block) 210, and a step (or block) 212. In the step 202, the process 200 receives an input point. In the step 204, the process 200 generates a read address for an eight bank memory containing a 3D color correction lookup table. In the step 206, the process shuffles the read address based upon the least significant bit of the index of the input point in each dimension of the input space. In the step 208, the process 200 reads the eight nearest neighbors from the eight banks based upon the shuffled addresses. In the step 210, the process 200 shuffles the outputs of the eight banks based upon the three least significant bits of the index of the input point. In the step 212, the process 200 presents the shuffled outputs to a color interpolator.

The present invention may provide access to the eight nearest table points in one clock cycle without increasing the memory size significantly. The memory is generally subdivided into eight banks with parallel access. The eight closest table entries to any point of the input space are always stored in different banks to allow parallel (simultaneous) access (retrieval). In general, a table entry may be assigned to a particular bank based upon the least significant bit of the index of the entry in each dimension of the input space. Since there are three dimensions in the input space, the three least significant bits may be concatenated to from a 3-bit number that selects one of the eight banks. The use of the three LSBs is generally sufficient to guarantee no bank conflicts for the eight closest points because neighboring points must differ by one in the least significant bit in at least one dimension (e.g., as described above in connection with FIG. 1).

The functions illustrated by the diagrams of FIGS. 2-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a memory comprising eight banks, wherein each bank stores a portion of a three-dimensional (3D) color correction lookup table;
a first circuit configured to (i) generate eight read addresses for reading eight nearest neighbors of an input point from said eight banks of said memory in response to an index of said input point in each dimension of an input space and (ii) shuffle said eight read addresses among said eight banks of said memory based upon a least significant bit of said index of said input point in each dimension of the input space; and
a second circuit configured to arrange outputs of said eight banks of said memory for color interpolation, wherein said outputs are arranged based upon the least significant bit of said index of said input point in each dimension of the input space.

2. The apparatus according to claim 1, wherein said first circuit comprises a shuffle network.

3. The apparatus according to claim 2, wherein said shuffle network comprises a perfect shuffle network.

4. The apparatus according to claim 2, wherein said shuffle network comprises eight address shuffle units, each address shuffle unit configured to select one of eight inputs for presentation to a respective bank of said memory in response to a logical combination of the least significant bit of said index of said input point in each dimension of the input space and a bank number of said respective bank.

5. The apparatus according to claim 2, wherein said shuffle network comprises three stages, wherein each stage is controlled by the least significant bit of said index of said input point in a respective one of the dimensions of the input space.

6. The apparatus according to claim 1, wherein said second circuit comprises a shuffle network.

7. The apparatus according to claim 6, wherein said shuffle network comprises a perfect shuffle network.

8. The apparatus according to claim 6, wherein said shuffle network comprises eight data shuffle units, each data shuffle unit configured to select one of the eight outputs from said eight banks of said memory for presentation as a respective data entry for said color interpolation, wherein selection of the eight outputs is based upon a logical combination of the least significant bit of said index of said input point in each dimension of the input space and a data index of said respective data entry.

9. The apparatus according to claim 6, wherein said shuffle network comprises three stages, wherein each stage is controlled by the least significant bit of said index of said input point in a respective one of the dimensions of the input space.

10. The apparatus according to claim 1, wherein said memory is configured such that at least one bank contains an address x[n:1], y[n:1], z[n:1].

11. The apparatus according to claim 1, further comprising an interpolation module configured to generate an index in each dimension of an output color space based upon the outputs of said eight banks of said memory as arranged by said second circuit.

12. The apparatus according to claim 1, wherein said color correction lookup table is configured to transform the index of said input point in each dimension of the input space to a standard color space selected from the group consisting of BT629, BT709, and sRGB.

13. A method for three-dimensional (3D) color correction comprising the steps of:
receiving an index for an input point in each dimension of an input space;
generating eight read addresses for an eight bank memory containing a 3D color correction lookup table, wherein the eight read addresses are generated in response to the index of the input point in each dimension of the input space and correspond to nearest input grid points of said lookup table for said input point;
shuffling the eight read addresses among the eight banks of said eight bank memory based upon the least significant bit of the index of the input point in each dimension of the input space;

reading eight nearest table entries from the eight banks based upon the shuffled read addresses;

shuffling the outputs of the eight banks based upon the least significant bit of the index of the input point in each dimension of the input space; and presenting the shuffled outputs to a color interpolator.

14. The method according to claim 13, wherein shuffling the read addresses based upon the least significant bit of the index of the input point in each dimension of the input space comprises:

presenting the read addresses to a shuffle network comprising eight address shuffle units, wherein each address shuffle unit is configured to select one of read addresses for presentation to a respective bank of said eight bank memory in response to a respective control signal.

15. The method according to claim 14, further comprising generating the respective control signal of each address shuffle unit by logically combining the least significant bit of said index of said input point in each dimension of the input space and a bank number of said respective bank.

16. The method according to claim 13, wherein shuffling the outputs of the eight banks based upon the least significant bit of the index of the input point in each dimension of the input space comprises:

presenting the outputs of the eight banks to a shuffle network comprising eight data shuffle units, wherein each data shuffle unit is configured to select one of eight outputs from said eight memory banks for presentation as a respective data entry for said color interpolator in response to a respective control signal.

17. The method according to claim 16, further comprising generating the respective control signal of each data shuffle unit by logically combining the least significant bit of said index of said input point in each dimension of the input space and a data index of said respective data entry.

18. The method according to claim 13, wherein said color interpolator performs tri-linear interpolation.

19. The method according to claim 13, wherein said color interpolator performs Sakamoto interpolation.

20. An apparatus comprising:

means for storing a three-dimensional (3D) color correction lookup table, wherein eight entries of said three-dimensional (3D) color correction lookup table are accessible in parallel;

means for generating eight read addresses for reading eight nearest neighbors of an input point from said storage means in response to an index of said input point in each dimension of an input space;

means for shuffling said eight read addresses among address inputs of said storage means based upon a least significant bit of said index of said input point in each dimension of the input space; and means for arranging eight outputs of said storage means for color interpolation, wherein said outputs are arranged based upon the least significant bit of said index of said input point in each dimension of the input space.

* * * * *